Nov. 1, 1960  J. R. TURK  2,958,122
INSULATING MACHINE
Filed April 9, 1957  8 Sheets-Sheet 1

INVENTOR.
JAMES R. TURK
BY
Oberlin & Limbach
ATTORNEYS.

Nov. 1, 1960　　　J. R. TURK　　　2,958,122
INSULATING MACHINE
Filed April 9, 1957　　　8 Sheets-Sheet 2

INVENTOR.
JAMES R. TURK
BY
Oberlin & Limbach
ATTORNEYS.

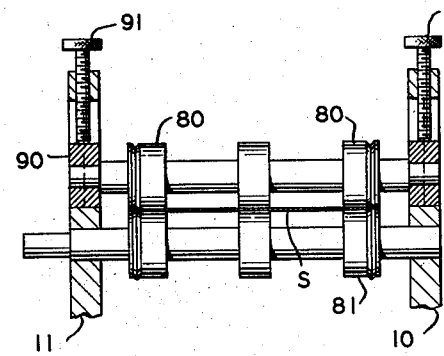
FIG. 3
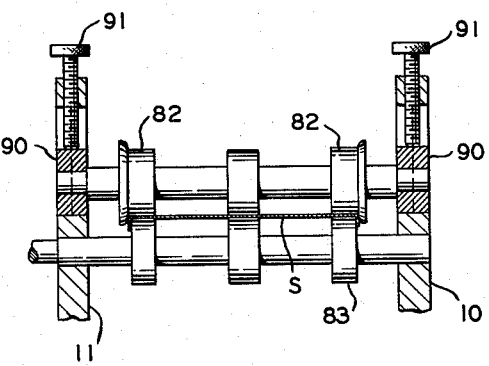
FIG. 4
FIG. 6
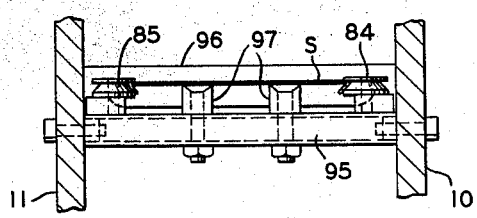
FIG. 5
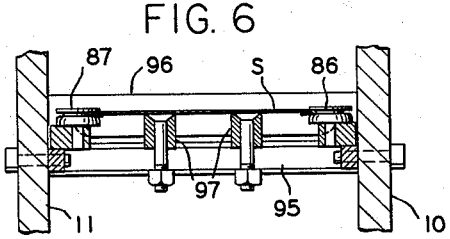
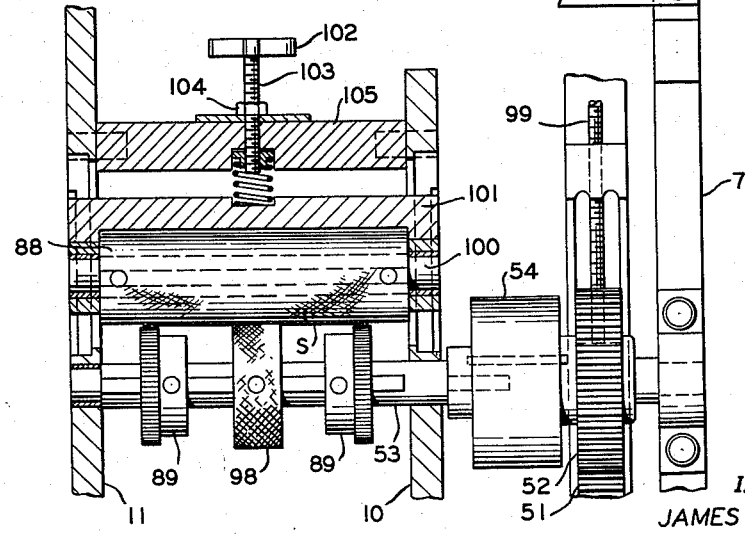
FIG. 7
INVENTOR.
JAMES R. TURK
BY Oberlin & Limbach
ATTORNEYS.

INVENTOR.
JAMES R. TURK

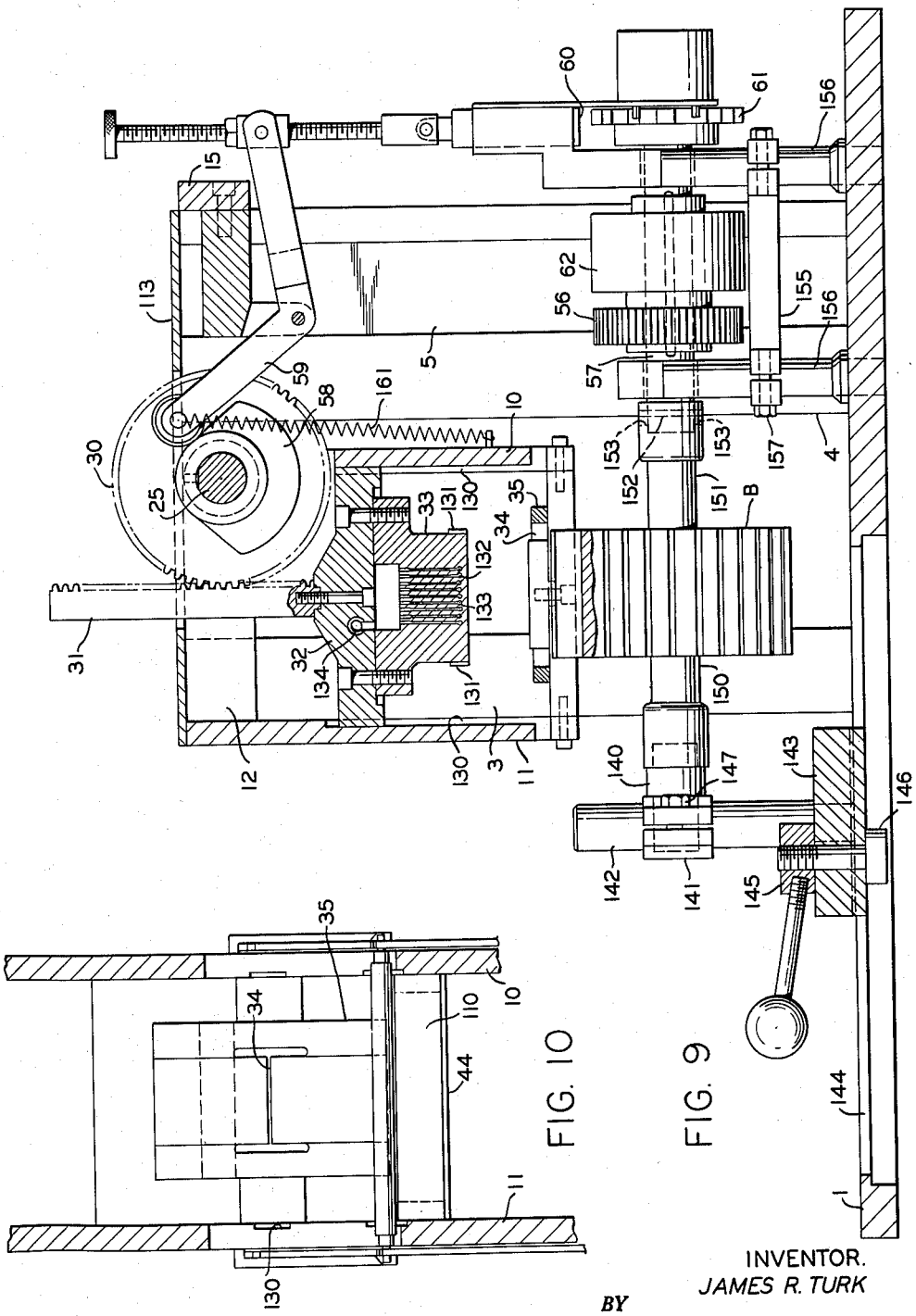

INVENTOR.
JAMES R. TURK
BY
Oberlin & Limbach
ATTORNEYS.

Nov. 1, 1960  J. R. TURK  2,958,122
INSULATING MACHINE
Filed April 9, 1957  8 Sheets-Sheet 7

INVENTOR.
JAMES R. TURK
BY
Oberlin & Limbach
ATTORNEYS.

Nov. 1, 1960    J. R. TURK    2,958,122
INSULATING MACHINE
Filed April 9, 1957    8 Sheets-Sheet 8

INVENTOR.
JAMES R. TURK
BY
Oberlin & Limbach
ATTORNEYS.

United States Patent Office 2,958,122
Patented Nov. 1, 1960

2,958,122

INSULATING MACHINE

James R. Turk, Euclid, Ohio, assignor to Vincent K. Smith, Gates Mills, Ohio

Filed Apr. 9, 1957, Ser. No. 651,680

10 Claims. (Cl. 29—205)

The present invention relates generally as indicated to an insulating machine which is operative to cut to size, form and insert strips of insulating material such as paper, for example, into the slots of a dynamo-electric or any other slotted electric machine component prior to the placing of copper wire coils in the slots thereof. More specifically, the insulating machine herein is adapted to insert insulating strips into the slotted body of an armature or in the externally slotted spider of a composite stator as is disclosed in the patent to Vincent K. Smith, Pat. No. 2,565,530, dated August 28, 1951.

Hitherto, much time and cost has been expended in the manual insertion of preformed strips of insulating material into the slots of such stator spider or slotted armature body, such insertion usually being effected from the end of the slotted body. If flat strips are employed, these must be bent to approximately V or U shape, before insertion, and even if the strips are thus preformed, it yet takes considerable time to manually insert said strips in the slots of the spider or armature body.

Accordingly, it is a principal object of this invention, to provide a machine for achieving automatic and rapid assembly of insulating strips in a slotted body.

It is another object of this invention to provide a versatile insulating machine that is readily adjustable to accommodate slotted bodies having different numbers of slots, and having different diameters and stack heights of laminations.

It is another object of this invention to provide an insulating machine which, once set up, automatically and intermittently pulls the insulating material from a coil; if required, cuffs the opposite edges of the strip; cuts off the end of the strip to a length sufficient to line the opposite side walls and bottoms of the slots; transfers the cut piece to an inserter station; and finally inserts the cut piece into one of the slots of the slotted body while flaring out the edges of the insulating strip to overlie the sharp corners of the slots. Following the insertion of the strip, as aforesaid, the slotted body is then indexed preparatory to receiving the next piece of insulating material in an adjacent slot.

Other objects and advantages of the present invention will become apparent as the following description proceeds.

To the accomplishment of the foregoing and related ends, the invention, then, comprises the features hereinafter fully described and particularly pointed out in the claims the following description and the annexed drawings setting forth in detail a certain illustrative embodiment of the invention, this being indicative, however, of one of the various ways in which the principle of the invention may be employed.

In said annexed drawings:

Figs. 3 to 9 are various sub-assembly and detail cross-section views taken substantially along the lines 3—3 to 9—9 respectively of Fig. 1;

Fig. 10 is a horizontal section view along line 10—10, Fig. 2;

Figure 1:
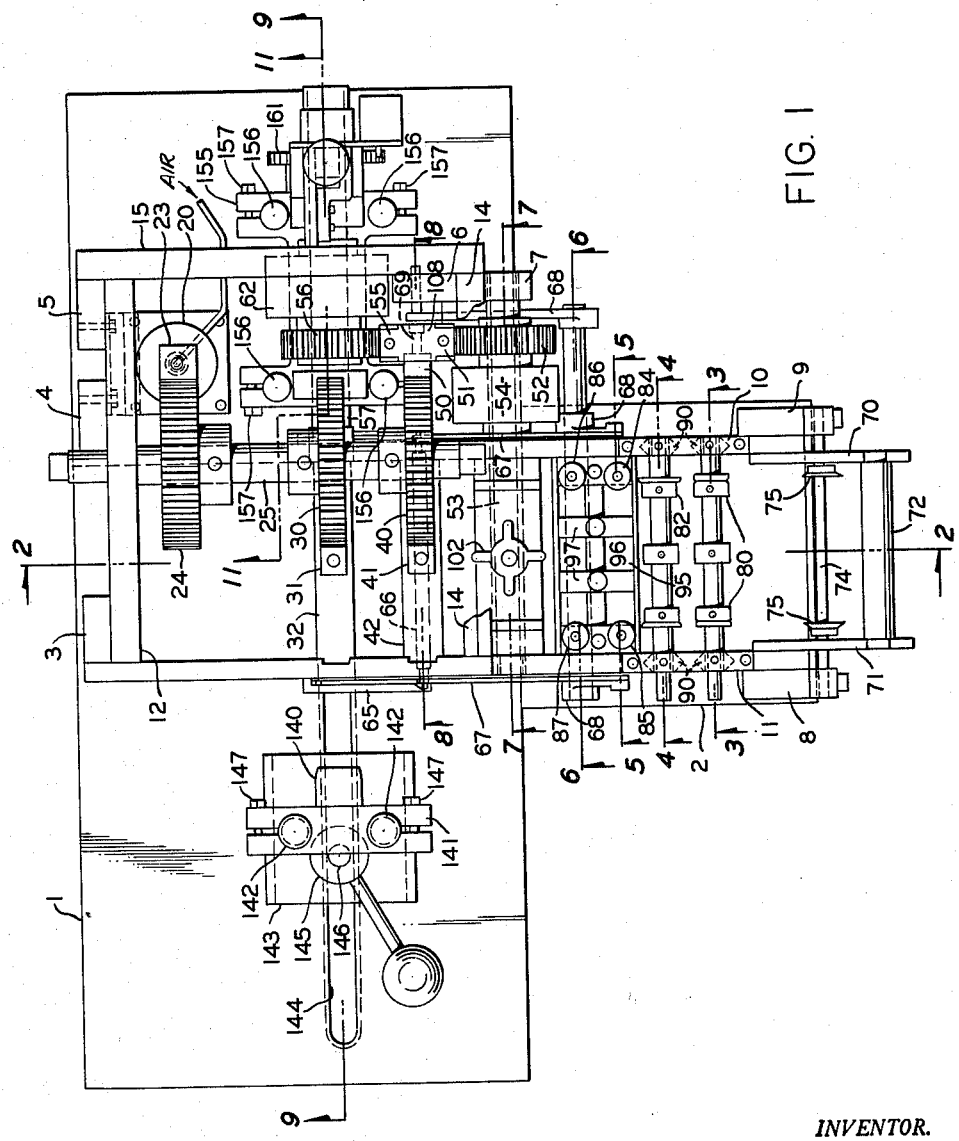
Fig. 1 is a top-plan view of a preferred embodiment of this invention.

The frame of the machine herein disclosed comprises a generally rectangular base plate 1 to which is welded or otherwise secured an extension 2, said extension being herein shown as welded to the base plate 1. The base plate assembly comprising said plate 1 and extension 2 has secured thereto as by means of bolts, a plurality of upstanding posts 3, 4, 5; 6, 7; and 8, 9 to posts 3, 4 and 8, 9 of which a pair of oppositely disposed parallel plates 10 and 11 are secured, as by bolts, and to posts 3, 4, 5 and post 6 of which, cross bars 12 and 14, and 15 are similarly secured to tie together the structure, said parallel plates 10, 11 providing bearings for the ends of shafts of cuffing and feed rolls as hereinafter explained and providing guideways for a shear blade and an inserter blade, also as hereinafter explained, and cross bars 12 and 14 constituting bearings for the main drive shaft which also is to be described in greater detail under the appropriate heading.

In order to facilitate the understanding of the structure and operation of this machine, the description thereof has been broken down under the main headings I—Power Plant; II—Insulating Strip Forming and Handling; III—Slotted Body Support, Indexer, and Lock; and IV—Operation.

I—POWER PLANT AND TRANSMISSION OF POWER TO INSULATION INSERTER, INSULATION CUTTER, INSULATION FEED, SLOTTED BODY INDEXER, AND INSULATION TRANSFER

The power plant in the present case, is shown as comprising a double acting pneumatic cylinder 20 having its piston rod 21 connected to gear rack 23, said gear rack 23 meshing with a main drive gear 24 that is keyed onto the drive shaft 25, the latter being journaled in sleeve bearings, as aforesaid in the cross bars 12 and 14. From said drive shaft 25, power is transmitted to the various parts and sub-assemblies of the machine as follows:

*Inserter*

Next, a gear 30 on said drive shaft 25 meshes with a vertically reciprocable gear rack 31 that has its lower end secured to the inserter blade slide 32, the inserter blade 33 on said slide as explained later in detail being effective to shove a strip S of insulation material thereunder through a slot 34 in a platen 35 and into the slot of stator spider or armature body B therebeneath.

*Cutter or shear*

Another gear 40 on said drive shaft 25 meshes with another vertically reciprocable gear rack 41 that has its lower end secured to the cutter or shear blade, slide 42, the shear blade 43 carried thereby when moved downwardly, being effective to shear the strip S of insulating material to the proper length in cooperation with bed knife 44 so that when said strip S is inserted into the slot of the slotted body B as aforesaid, it will protect the sides of the slot from contact by the wire coils subsequently wound therein. The shear blade mechanism is described in further detail under the main heading II—Insulating Strip Forming and Handling.

*Insulation strip feed*

The aforesaid gear 40 also meshes with a main gear rack 50 of a vertically reciprocably mounted triple gear rack assembly, said assembly having its second gear rack 51 meshing with a gear 52 keyed on the shaft 53 extending across the pair of opposite plates 10 and 11, there being interposed between said shaft 53 and said gear 52, a one-way slip clutch 54 for a purpose as will become apparent as the ensuing description proceeds.

*Slotted body indexer and lock*

The third gear rack 55 of said triple gear rack assembly meshes with a gear 56 on the indexer shaft 57 with which the slotted armature body B is non-rotatably engaged. The locking of the indexer shaft 57 in the successive indexed positions is effected through a cam 58 on the drive shaft 25 which through a bell crank 59 is effective to move the locking plunger 60 downward into engagement with one of the V-notches formed in the periphery of the star wheel 61, said star wheel 61 being mounted on the indexer shaft 57 and being formed with V-grooves as shown corresponding in number and spacing with the slots in the slotted body B. The reference numeral 62 denotes a one-way slip clutch on shaft 57.

*Insulating strip transfer mechanism*

The strip transfer mechanism basically comprises a reciprocating carriage 65 that has a rubber-tired pin 66 frictionally engaged with the sheared insulating strip S to move the same longitudinally from the shearing station to the inserter station, such movement of the carriage 65 being effected through links 67 on one end of a bell crank link assembly 68 of which the other end is pivotally engaged with a pin 69 of said triple gear rack assembly. Detailed operation is described later.

II—INSULATING STRIP FORMING AND HANDLING

*Reel and support therefor*

Figure 2:
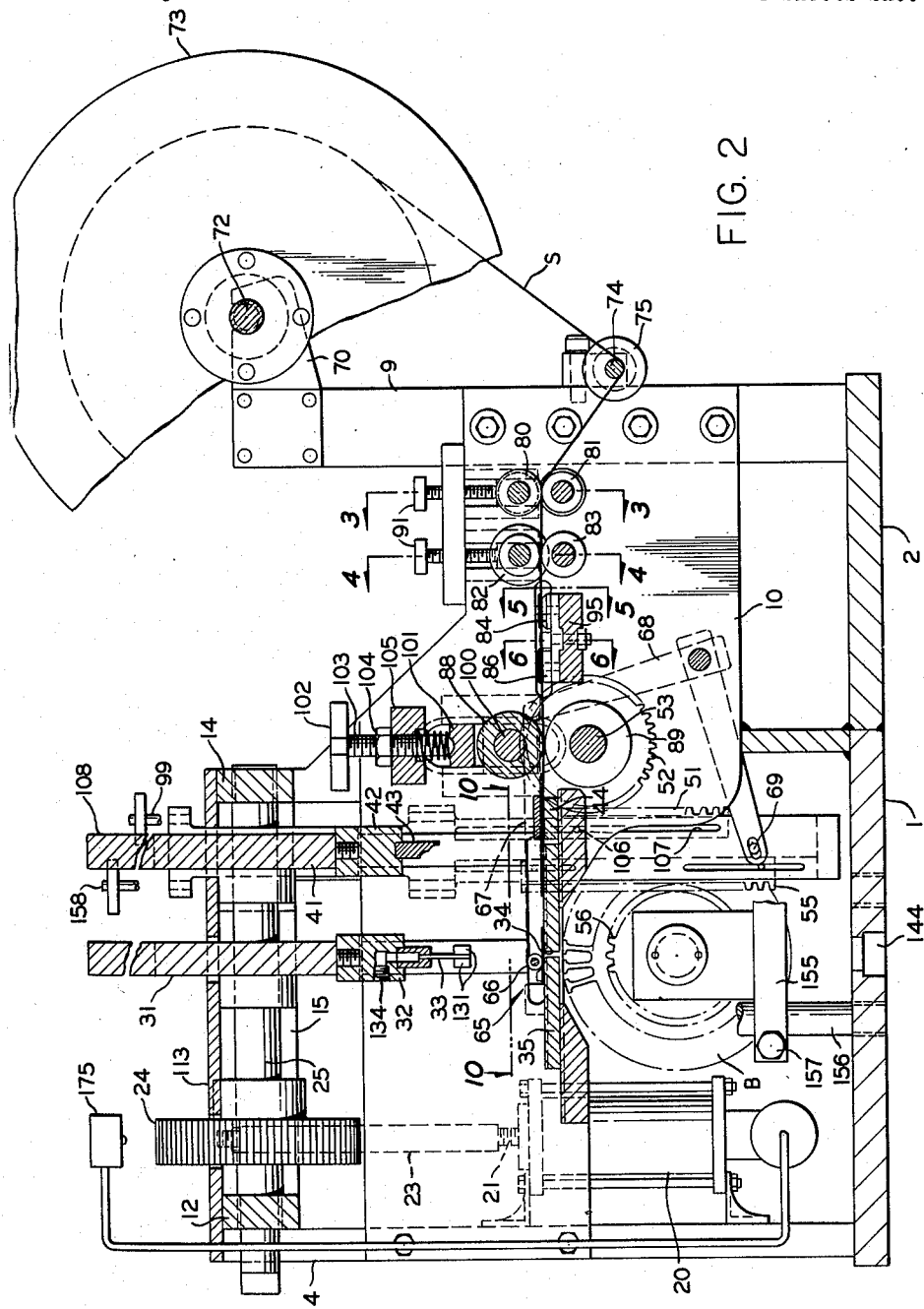
Fig. 2 is a vertical cross-section view, such section having been taken substantially along the line 2—2 Fig. 1.

As best shown in Figs. 1 and 2, the posts 8, 9 to which the opposed plates 10, 11 are bolted have secured at their upper ends, brackets 70, 71 formed with upwardly open slots to accommodate the shaft 72 of a reel 73, the reel 73 having wound therearound, a long length of insulating material S, preferably insulating paper which, for example, is of relatively hard and smooth finish and of about .010" thickness.

The end of the insulating strip S is drawn from the coil and passes underneath a shaft 74 between guide rolls 75 and then between scoring rolls 80—81 (see Figs. 1 and 3) that form crease lines or score lines spaced, for example, about ⅛" from the opposite edges of said strip S.

*Strip cuffing rolls*

As best shown in Figs. 1 to 7 inclusive and particularly Figs. 3 to 7 thereof, the insulating strip S passes successively between sets of rolls of which the first set 80—81 (Fig. 3) is arranged to score the strip at the cuffing line as aforesaid.

The second set of rolls 82—83 as best shown in Fig. 4, bend the edges down 90°, whereafter, the third and fourth sets of rolls 84—85 and 86—87 arranged for rotation about vertical axes first turn the edges inward 45° and then 90° under the strip S itself.

Finally, the thus cuffed strip 5 (if cuffing be found necessary) passes between feed rolls 88—89 effective to drive the strip S longitudinally and in addition to tightly squeeze the cuffs, if any, formed by rolls 82—83, 84—85, and 86—87.

As best shown in Figs. 3 and 4, said first two sets of rolls 80—81 and 82—83 each include a bottom roll 82 and 83 journaled in the opposed plates 10—11 and a top roll 80—82 journaled in bearing blocks 90 that are formed with opposite V-shaped edges vertically reciprocably support in V-shaped grooves formed in said opposed plates 10—11. Said top rolls 80—82 are vertically adjusted as by means of thumb screws 91 so as to exert pressure on the strip S as it is pulled between said rolls by the feed rolls 88—89.

The rolls 84—85 and 86—87 that turn the edges of strip S inward are mounted upon a cross piece 95 anchored at its ends to said opposed plates 10 and 11. Said cross piece 95 is additionally provided with a top plate 96 and with a pair of longitudinally extending bars 97 which are operative to maintain the insulating strip S in flat condition as the opposite edge portions thereof are turned in by the sets of rollers 84—85 and 86—87.

The feed rolls 88—89 (see Fig. 7) are operative to intermittently feed the insulating strip S forward through the machine, rolls 89 and 98 constituting drive rolls keyed on drive shaft 53. Said drive shaft is journaled in the opposed plates 10 and 11 and has one end connected to one-way drive clutch 54, which is effective to drive said rolls 89 and 98 to move the insulating strip S forward when the gear 52 on the other end of said clutch 54 is turned in one direction and to slip, without moving the paper backward, when said gear 52 is turned in the opposite direction. As previously described, the gear 52 is thus turned back and forth by the vertical reciprocation of the gear rack 51 in mesh with said gear 52.

The amount of forward advance of the strip S is determined by the adjusting screw 99.

The back-up roll 88 disposed above said drive rolls 89 and 98 is keyed on a shaft 100 that is journaled in a slide 101, the latter being vertically movable in slideways formed in said opposed plates 10 and 11. Said back-up roll slide 101 is spring-loaded to maintain pressure engagement of the Strip S between said back-up roll 88 and said drive rolls 89 and 98, and such pressure may be varied by turning the handwheel 102 of adjusting screw 103, said adjusting screw being locked in predetermined position by means of the locknut 104 engaging the cross bar 105 in which said screw is threadedly engaged.

Referring again to the adjustment of the intermittent forward advance of the insulating strip by the feed rolls 88—89, it is to be noted from Fig. 2, for example, that said gear rack 51 has a lost motion pin 106 and slot 107 connection with the gear rack 50 carrier 108, the amount of such lost motion being determined by the adjustment of screw 99. In other words, the rack 50 and carrier 108 will move downward a predetermined amount without causing any downward movement of said gear rack 51 but when the end of screw 99 abuts rack 51, the latter will be moved downward in unison with rack 50 to rotate the feed roll drive shaft 53 through the gear 52 and clutch 54. During the upstroke of rack 50 and carrier 108, rack 51 will not be raised until pin 106 engages the end of slot 107 but such upward movement will not turn shaft 53 because reverse rotation of gear 52 is not transmitted through clutch 54.

*Strip cutter*

Figure 8:
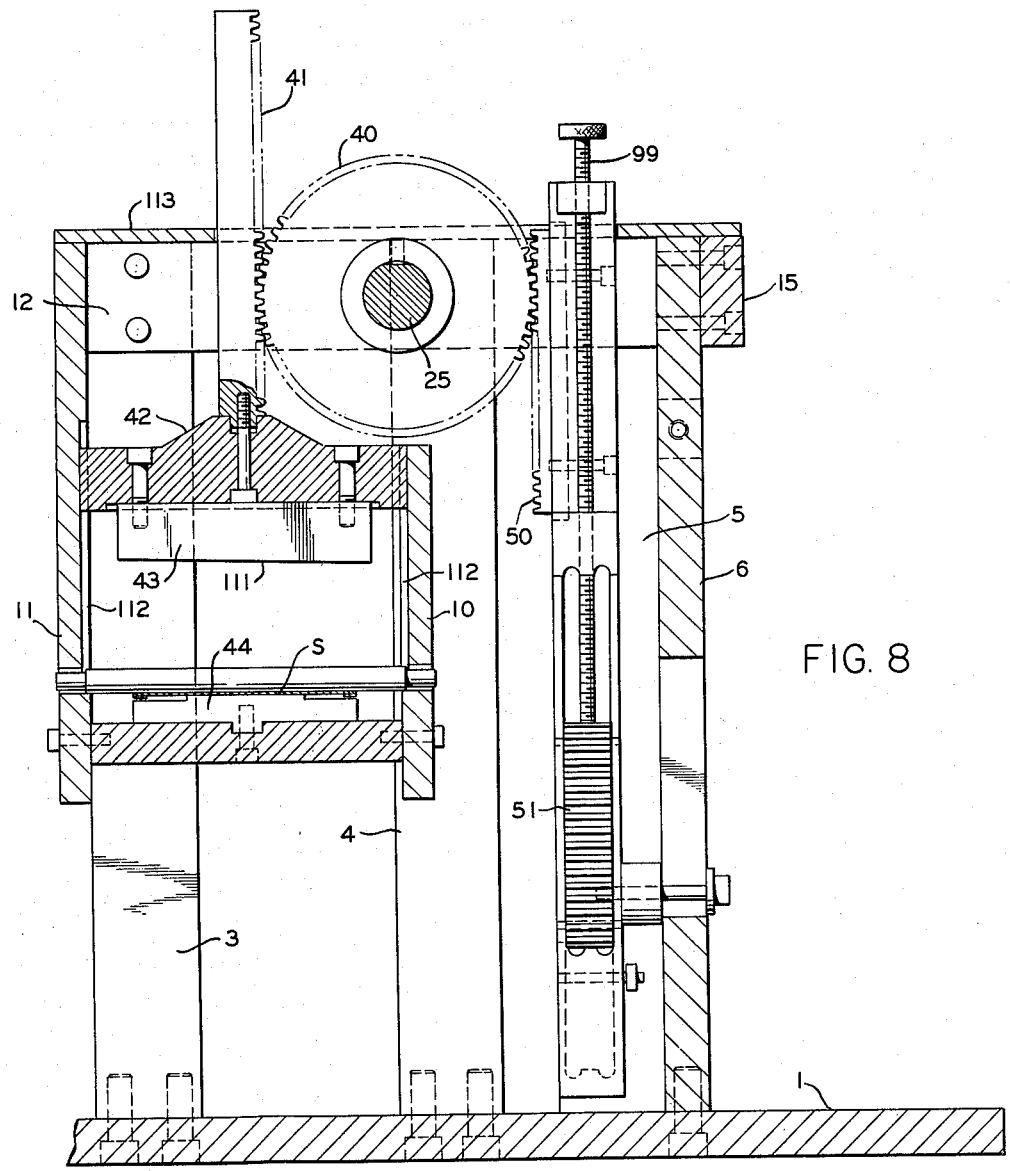
Figure 12:
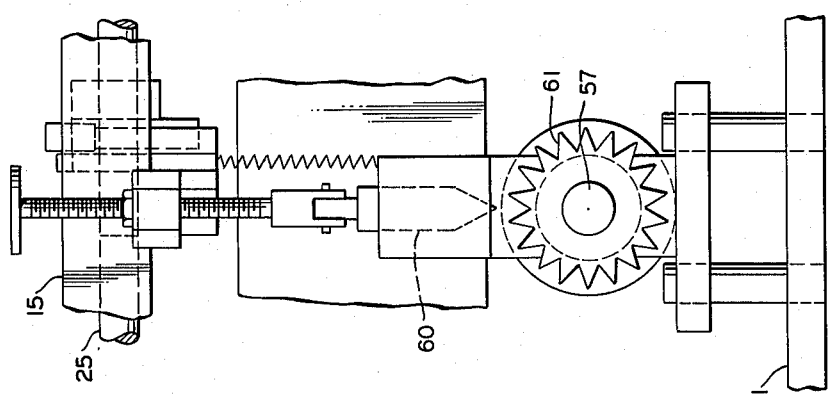
Fig. 12 is an elevation view as viewed from the right-hand side of Fig. 11.

Referring now to Figs. 1, 8, and 10, the mechanism for severing the insulating strip S comprises a fixed shear-blade 44 or support over which extends the cross bar 110 to hold the insulating strip S in flat condition, said support 44 and top cross-bar 110 being secured together adjacent their ends.

The movable shear blade 43 is formed with an edge 111, preferably slightly inclined as best shown in Fig. 8, said blade 43 being bolted or otherwise secured to a slide 42 which is vertically movable in parallel slideways 112 formed in said opposed plates.

As before described, the lower end of a gear rack 41 is bolted to said slide 42 and extends upwardly through an opening in the top plate 113 of the machine, said gear rack 41 meshing with the gear 40 on the main drive shaft 25. As apparent, when said gear 40 rotates in a counterclockwise direction as viewed in Fig. 8, the slide 42 and blade 43 mounted thereon will move downwardly and in cooperation with the fixed blade or support 44, the insulating strip S will be cleanly severed, whereupon when the feed rolls 88—89 are next driven the insulating strip S will be advanced through the slot between the support 44 and cross bar 110 ready to be cut upon the next downward stroke of the shear blade 43.

Strip transfer mechanism

Figure 14:
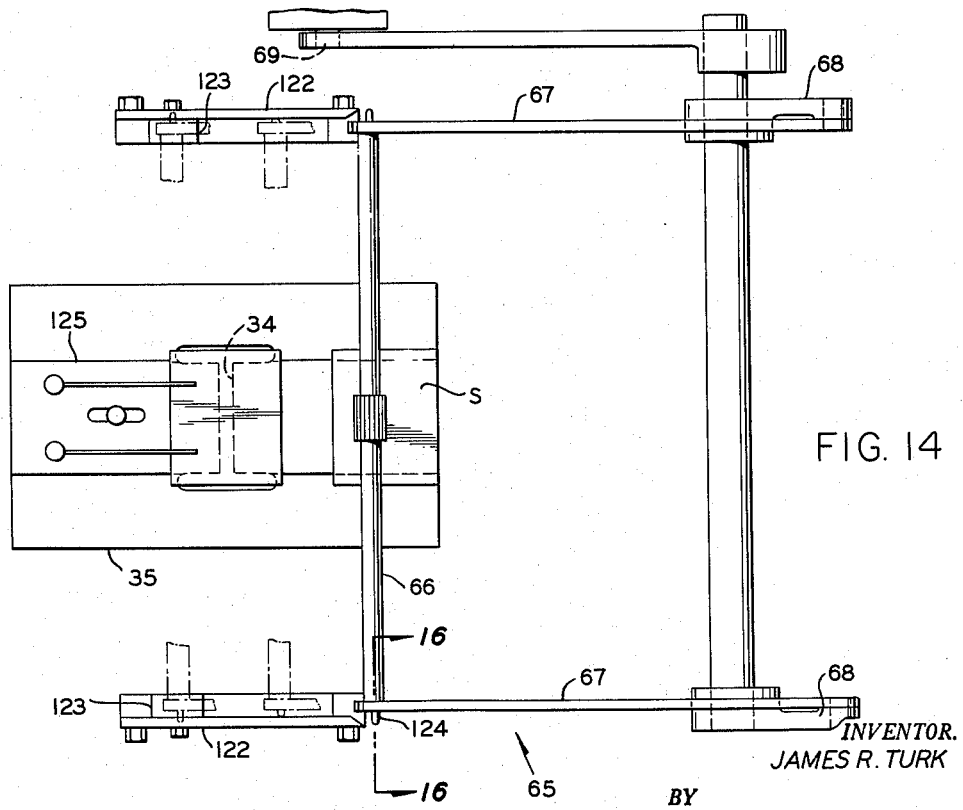
Figs. 14, 15, and 16 are top plan, side elevation, and detail section (along line 16—16, Fig. 14) views of the insulating strip transfer mechanism.
Figure 15:
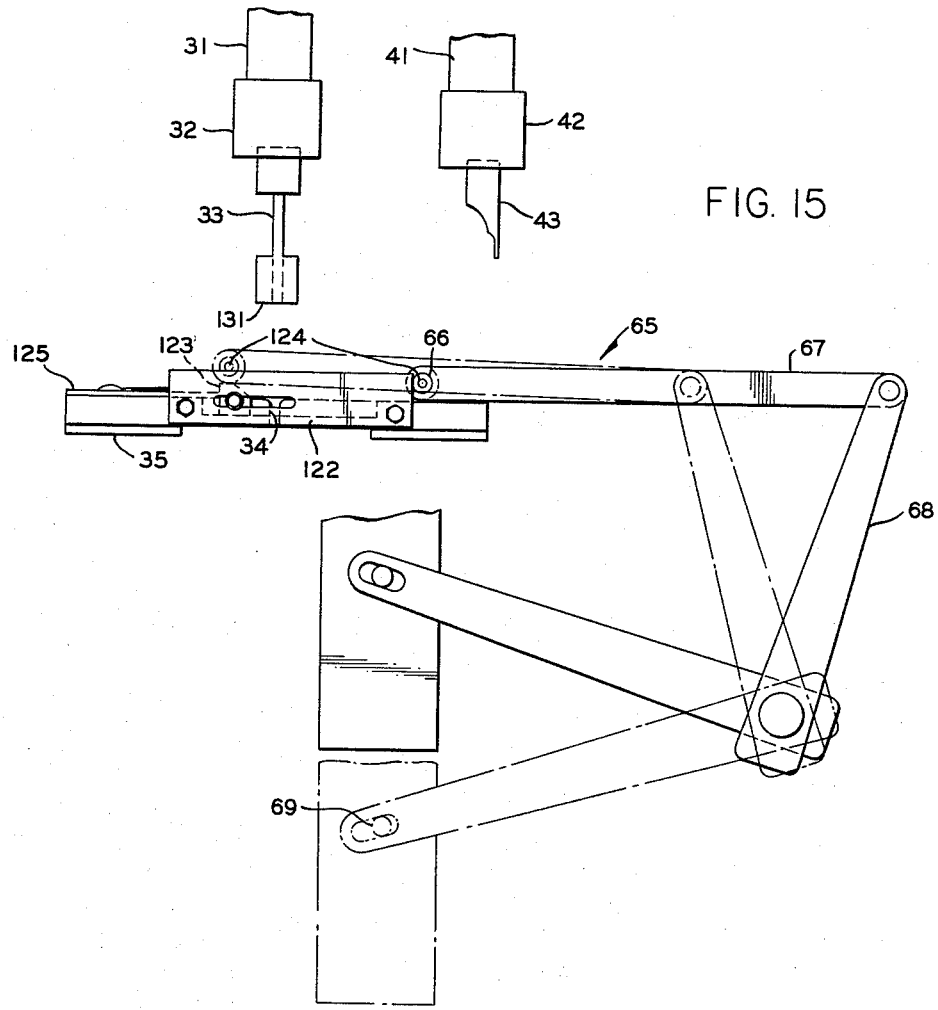
Figure 16:
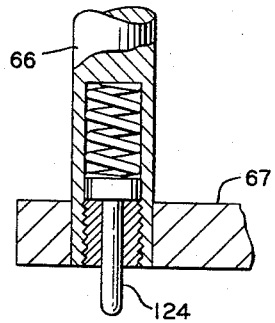

The severed length of the insulating strip S is disposed underneath an axially striated rubber-tired pin 66 that forms a portion of a transfer carriage, or frame 65, the ends of said pin being connected to links 67 which in turn, are linked to the upper end of the bell crank link assembly 68, whereupon as the bell crank is rotated in a counterclockwise direction (as viewed in Fig. 2), the rubber-tired pin 66 will be advanced toward the left to move with it the severed piece of insulating strip S. As the transfer carriage 65, constrained by guides 122 (see Figs. 14, 15, and 16) approaches the left-hand end of its stroke, it and pin 66 are lifted by the cam 123 and spring detents 124, in the frame pop-out to ride on the top of the guide 122 so that during the return movement of the transfer frame and pin 66 to the right, the rubber-tired pin 66 is disengaged from the severed piece of insulating material S. The rubber-tired pin 66 during its forward movement moves the severed piece so that the left hand edge thereof abuts the adjustable positioning stop 125. Such stop 125 is adjusted so that the transverse center line of the cut piece is centered over the slot 34 formed in the platen 35.

Strip inserter mechanism

This mechanism comprises an inserter blade 33 carried by a slide 32 that is vertically movable in the vertical slideways 130 (Figs. 9 and 10) in opposed plates 10 and 11 and which slide has secured thereto the lower end of a vertically disposed gear rack 31, said gear rack meshing with the gear 30 on the drive shaft 25. Said blade 33 is fashioned so as to pass through the slot 34 in the platen 35 and is formed with laterally projecting wings 131 at both ends that are effective to flare out the end portions of the strip S as it is forced down through the slot 34 and into the slot of the spider or armature body B. In order to facilitate the spreading apart of the generally V or U shaped strip S after it has been pushed down by the blade 33 through the slot 34, said blade 33 may be formed with a series of air passages 132, with opposite outwardly directed orifices 133 through which air under pressure is adapted to flow from a port 134 formed in the slide 32, said port 134 having a flexible hose or like duct connected thereto leading from a source of air pressure. In such air supply line, there will be included a suitable valve (not shown) that will permit air flow when the inserter blade 33 reaches the lower end of its stroke.

The flaring out of the ends of the inserted strip S protects the corners of the spider or armature body slots from short circuiting or grounding the wire coils to be wound in the slots, and, in addition, such flaring out serves to retain the insulating strips 5 in place against slipping out axially from the spider or armature body slots.

III—SLOTTED BODY SUPPORT, INDEXER, AND LOCK

This mechanism, as best shown in Figs. 1, 2, 8, 9, 11 and 12, especially Fig. 9, comprises a vertically adjustable spider or armature body drive shaft 57 and a vertically adjustable and longitudinally movable support shaft 140 that is coaxial with the drive shaft 57 and axially spaced therefrom.

Support shaft 140 is formed as a part of a block 141 that is vertically adjustable, as shown, on the posts 142 of a slide base 143, and slide base being longitudinally adjustable along T-slot 144 of the main machine base 1 and being locked in desired position as by means of a conventional lever operated nut 145 on T-bolt 146 that clamps base 143 on base 1. The portions of said block 141 which fit over the posts 142 are bifurcated and are adapted to be contracted to grip the posts as by means of screws 147. Said support shaft 140 is preferably designed to fit in the recess at the end of the spider clamp member 150 as best shown in Fig. 9. The other spider clamp member 151 may be in threaded engagement with clamp member 150 whereby the stack of laminations constituting the spider body B are tightly pressed together to form an exteriorly slotted, cylindrical body.

The drive shaft 57 fits in the recess in the end of clamp member 151 and is provided with a diametrically extending pin 152 that has its projecting ends fitted in keyways or slots 153 formed in the clamping member 151 whereby the spider or armature body B will be indexed in unison with drive shaft 57.

The base 155 that carries the bearings for drive shaft 57 is vertically adjustably mounted on four posts 156 secured to the main baseplate 1, said base 155 being formed with bifurcated openings adapted to be frictionally clamped on said posts 156 at the desired height by screws 157. Said drive shaft 57 has mounted thereon a one-way slip clutch 62 and a gear 56, said gear being meshed with gear rack 55 and again there is a lost motion connection between said gear rack 55 and rack 50 and its carrier 108. Said rack 50 meshes with the gear 40 of the main drive shaft 25, whereby, after the adjustable lost motion connection is taken up, the gear rack 55 in mesh with the gear 56 cause an indexing of the spider drive shaft and indexer. In this case, the adjusting screw 158 cooperates with rack 55 in the same way as screw 99 does with rack 51.

In order to lock the indexer shaft 57 at each of its indexed positions, there is mounted thereon a star wheel 61 having V-grooves around its periphery corresponding in number and angular spacing to the slots of the spider or armature body B in which the insulating strips are to be inserted. Said indexer shaft 57 is locked by moving downward into engagement with said star wheel 61, the plunger 60 that is operated by the bell crank 59, the bell crank in turn being oscillated by a cam 58 mounted on the main drive shaft 25, the cam follower 160 on said bell crank being held against the cam 58 as by means of the tension spring 161 (see Fig. 11).

The locking plunger 60 is adjusted merely by turning the screw 161 which raises or lowers said plunger 60 so that in its maximum lowered position as determined by the cam 58, the bottom V-shaped end of said plunger 60 is firmly engaged in a V-shaped notch of the star wheel 61.

Assuming now that it is desired to place a spider or armature body B into the machine after the guide shaft 140 and indexer shaft 57 have been adjusted so as to be at the same desired height and co-axial, the slide 143 then being in its retracted position, that is, toward the left as viewed in Fig. 9. The operator simply slips the slotted end of clamp member 151 over the end of shaft 57, and then moves the slide 143 forward to slip the pilot of shaft 140 into clamp member 150. In that position, the nut 145 is tightened to thus lock the slide 143 on base 1.

After the inserter blade 33 has moved downwardly to force the severed piece of insulating material S through the slot 34 of the platen 35 and into the slot of the spider or armature body B and has commenced its upward stroke, the turning of gear 40 moves rack 50 and carrier 108 down to take up lost motion between carrier 108 and rack 55 whereafter downward movement of rack 55 turns gear 56 and through clutch 62 turns shaft 57 to index the same to position the next slot of body B under platen slot 34. At that time, the lock plunger 60 is moved down to engage star wheel 61, and remains down as rack 55 subsequently moves up during the succeeding down movement of inserter blade 33.

IV—OPERATION

Figure 13:
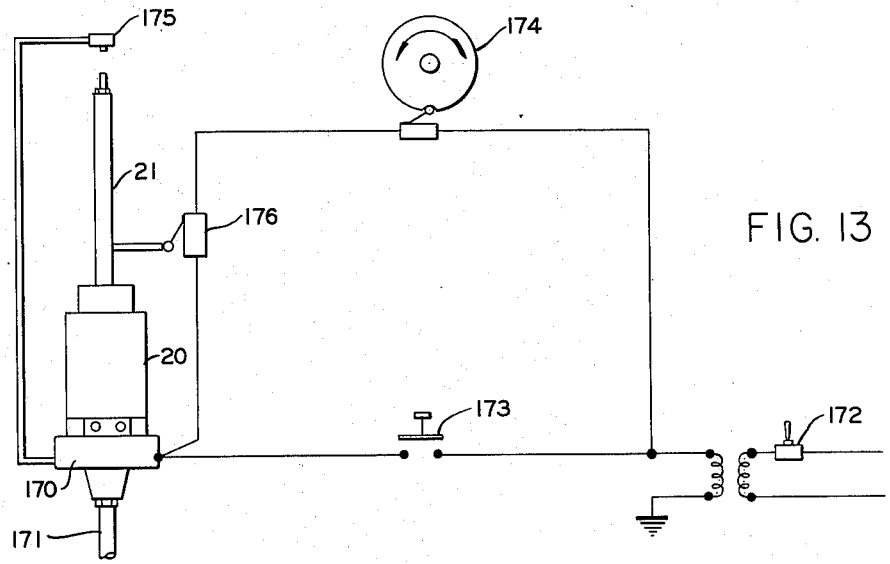
Fig. 13 is a schematic wiring diagram by which automatic operation of the machine herein is accomplished.

Referring first to Fig. 13, there is shown therein a schematic wiring diagram for achieving automatic operation of the insulating machine herein. The pneumatic cylinder 20 from which force is derived for oscillating the main drive shaft 25, has associated therewith a solenoid operated reversing valve 170, which alternately admits air under pressure from the air supply line 171, into the upper and lower ends of the cylinder 20 to move the piston rod 21 down and up respectively. There is preferably a switch 172 in the main electric power line and in the secondary circuit, there is a contactor 173 that energizes the solenoid valve and sets the counter 174 in operation, said counter being settable to correspond to the number of slots in the spider or armature body B into which the insulating strips S are to be inserted.

When the contactor 173 is depressed to close the electrical circuit, the solenoid valve 170 is actuated to admit air into the lower end of the cylinder 20 to move the piston rod 21 upward until said piston rod 21 actuates the switch 175 to reverse the solenoid valve 170 whereupon air under pressure is then admitted to the top of the cylinder 20 to move the piston rod 21 downward, such downward movement continuing until the switch 176 is actuated by the piston rod. At that time the solenoid valve 170 will again be reversed to cause the piston rod 21 to move upwardly. Such reciprocation of the piston rod 21 in the cylinder will continue until all of the slots in the spider or armature body B have had insulating strips S inserted thereinto. At that time, the counter 174 will open the electrical circuit by actuating the switch 176, whereupon the machine will remain inoperative until the operator depresses contactor 173. When the piston rod 21 and rack 23 thereon move upwardly the main drive shaft 25 is turned in a counterclockwise direction, as viewed in Figs. 9 and 11 and both the shear blade 43 and inserter blade 33 will be moved downward to cut the insulating strip S and to insert the previously cut and transferred strip S.

Such counterclockwise turning of the main drive shaft 25 moves the triple rack assembly (racks 50, 51—55) upwardly so as to take up the lost motions between carrier 108 and racks 51 and 55. The gears 52 and 56 are turned by racks 51 and 55 but because of the star wheel 61 and the one-way clutches 54 and 56, the feed roll shaft 53 and the indexer shaft 57 are not turned.

Figure 11:
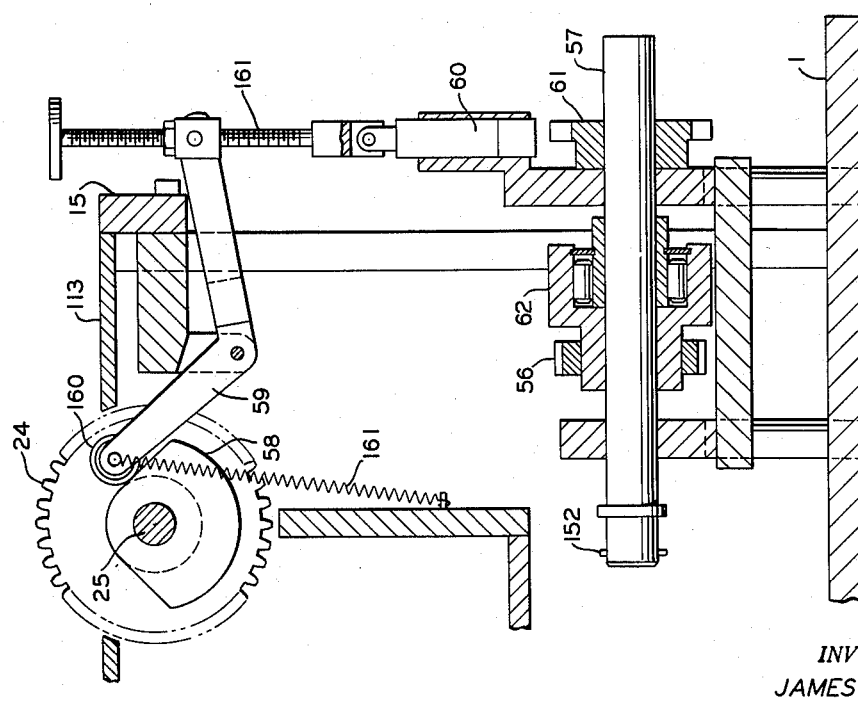
Fig. 11 is a vertical section view along line 11—11, Fig. 1.

During the downward movement of the piston rod 21 and rack 23, the main drive shaft 25 is turned in a clockwise direction as viewed in Figs. 9 and 11 to raise the shear blade 43 and inserter blade 33. After the downward lost motion connections aforesaid have been taken up and after the lock plunger 60 has been raised out of engagement with the star wheel 61, the feed roll shaft 53 is turned a predetermined degree and the indexer shaft 57 is likewise turned a predetermined degree to index the spider or armature body B carried thereby to position the next slot under the slot 34 of the platen 35 and also to position the next V notch of the star wheel 61 under the lock plunger 60.

During said upward and downward movements of the piston rod 21 and rack 23, the reciprocatory movements of the triple rack carrier 108 moves the transfer carriage back and forth to advance the cut strip S against the stop 125 and to lift up the transfer carriage 65 and to return the same to its retracted position in engagement with the projecting end of the next strip S which is to be cut by the shear blade 43.

Other modes of applying the principle of the invention may be employed, change being made as regards the details described, provided the features stated in any of the following claims, or the equivalent of such, be employed.

I, therefore, particularly point out and distinctly claim as my invention:

1. A machine for inserting strips of insulating material in the peripheral, axially extending slots of a cylindrical dynamo-electric machine component comprising a base; a holder on said base operable to grip such component with its axis disposed horizontally; a horizontally extending platen mounted on said base above said holder and provided with a slot vertically therethrough that is parallel to a slot of such component gripped by said holder and over which a strip of insulating material is adapted to be placed; an inserter mechanism mounted on said base above said platen and including an inserter blade supported by said mechanism for vertical reciprocation through such slot of said platen and into a slot of a component gripped by said holder to bend such strip to generally U-shape and thus push the strip through the slot of said platen into the slot of such component; said blade having lateral wings at its ends that are effective to flare out the ends of the strip when thus pushed into a slot of such component.

2. A machine for inserting strips of insulating material in the peripheral, axially extending slots of a dynamo-electric machine component comprising a base; a holder on said base operable to grip such component; a platen mounted on said base and provided with a slot therethrough over which a strip of insulating material is adapted to be placed, said platen being so positioned with respect to said holder that such slot of said platen will be disposed adjacent a slot of such component; and an inserter mechanism on said base including an inserter blade supported by said mechanism for reciprocation through such slot of said platen and into a slot of such component gripped by said holder to bend such strip to generally U-shape and thus push the strip through the slot of said platen into the slot of such component; said blade having lateral wings at its ends that are effective to flare out the ends of the strip when thus pushed into a slot of such component.

3. The machine of claim 2 wherein means are provided on said base to mount said holder for adjustment toward and away from said platen to thereby accommodate different sizes of such components.

4. The machine of claim 2 wherein the slot of said platen is of generally H-shape for reciprocation of said blade and its wings therethrough.

5. The machine of claim 2 wherein indexing means are provided for indexing said holder to position successive slots of such component in alignment with the slot of said platen, wherein means are provided for reciprocating said blade, and wherein means are provided to operate said indexing means in response to withdrawal of said blade from the slot of such component and from the slot of said platen.

6. The machine of claim 2 wherein a transfer mechanism is mounted on said base including a reciprocable carriage adapted, when moved in one direction, to frictionally engage a strip of insulating material on said platen and thus transfer it to a position over the slot of said platen, and a carriage shifter effective, when said carriage is moved in the opposite direction, to shift said carriage away from said platen to leave the strip of insulating material at its transferred position over the slot of said platen.

7. A machine for inserting strips of insulating material in the peripheral, axially extending slots of a dynamo-electric machine component comprising a base; a holder on said base operable to grip such component; a platen mounted on said base and provided with a slot therethrough over which a strip of insulating material is adapted to be placed, said platen being so positioned with respect to said holder that such slot of said platen will be disposed adjacent a slot of such component; an inserter mechanism on said base including an inserter blade supported by said mechanism for reciprocation through such slot of said platen and into a slot of such component gripped by said holder to bend such strip to generally U-shape and thus push the strip through the slot of said platen into the slot of such component; and a transfer mechanism mounted on said platen including a reciprocable carriage adapted, when moved in one direction, to frictionally engage a strip of insulating material on said platen and thus transfer it to a position over the slot of said platen, and a carriage shifter effective, when said carriage is moved in the opposite direction, to shift said carriage away from said platen to leave the strip of insulating material at its transferred position over the slot of said platen.

8. The machine of claim 7 wherein said carriage shifter is provided with a cam to so shift said carriage laterally away from said platen and from the strip engaged by said carriage.

9. The machine of claim 7 wherein said carriage initially is gravity actuated to frictionally engage the strip on said platen and is provided with spring-pressed plungers engaged with said carriage shifter to retain said carriage in frictional engagement with the strip during movement in such one direction, and wherein said carriage shifter has a cam to shift the carriage laterally away from said platen and from the strip at the end of such movement in one direction, and wherein said shifter and plungers have interengaged surfaces that support said carriage in the laterally shifted position during the movement of carriage in such opposite direction.

10. A machine for inserting strips of insulating material in the peripheral, axially extending slots of a dynamoelectric machine component comprising a base; a holder on said base operable to grip such component; a platen mounted on said base and provided with a slot therethrough over which a strip of insulating material is adapted to be placed, said platen being so positioned with respect to said holder that such slot of said platen will be disposed adjacent a slot of such component; and an inserter mechanism on said base including an inserter blade having air discharge passages on opposite sides therethrough such slot of said platen and into a slot of such component gripped by said holder to bend such strip to generally U-shape and thus push the strip through the slot of said platen into the slot of such component; said blade having air discharge passages on opposite sides thereof; and means for connecting an air pressure supply line to said blade whereby air emerging from such passages spreads apart the sides of the U-shaped strip into contact with opposite sides of the slot of such component.

References Cited in the file of this patent
UNITED STATES PATENTS

| | | |
|---|---|---|
| 1,479,248 | Moore | Jan. 1, 1924 |
| 1,980,170 | Eaton | Nov. 13, 1934 |
| 2,074,705 | Poole | Mar. 23, 1937 |
| 2,224,549 | O'Brien | Dec. 10, 1940 |
| 2,340,291 | Wirtz | Feb. 1, 1944 |
| 2,808,640 | Biddison | Oct. 8, 1957 |